Sept. 13, 1955  W. R. SANER  2,717,834
PHOTOGRAPHICALLY SENSITIVE ELEMENTS
Filed Dec. 2, 1952
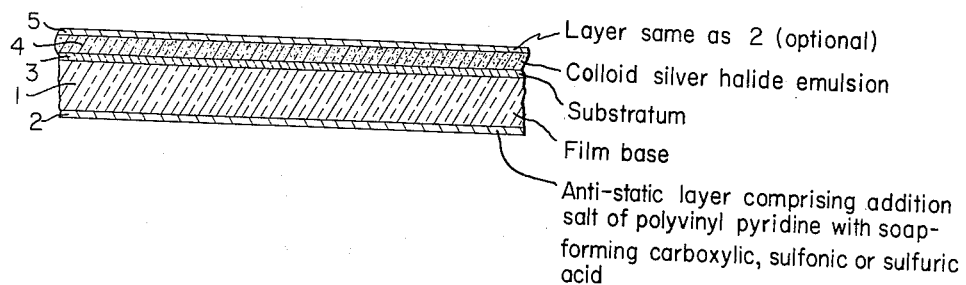
5 — Layer same as 2 (optional)
4 — Colloid silver halide emulsion
3 — Substratum
1 — Film base
2 — Anti-static layer comprising addition salt of polyvinyl pyridine with soap-forming carboxylic, sulfonic or sulfuric acid
INVENTOR
WILLIAM RUSSELL SANER
BY Lynn Barrett Morris
ATTORNEY United States Patent Office 2,717,834
Patented Sept. 13, 1955

2,717,834
PHOTOGRAPHICALLY SENSITIVE ELEMENTS

William Russell Sauer, Plainfield, N. J., assignor to E. I. du Pont de Nemours and Company, Wilmington, Del., a corporation of Delaware Application December 2, 1952, Serial No. 323,715

10 Claims. (Cl. 95—9)

This invention pertains to photographic elements having novel anti-static layers. More particularly it relates to photographic film elements bearing at least one light-sensitive silver halide emulsion layer and at least one anti-static layer which is composed of a salt of an anionic soap-forming acid, e. g., aromatic or aliphatic; carboxylic, sulfonic, or sulfuric acid, and to their preparation.

An object of this invention is to provide improvements in the art of photography. Another object is to provide photographic films, plates, and papers with new anti-static layers. A related object is to provide a photographic film element bearing at least one colloid silver halide emulsion layer on one surface with an anti-static layer on its opposite surface which can be readily removed in dilute aqueous acid solutions. Still other objects will be apparent from the following description of the invention.

It has been discovered that vinylpyridine polymers form polymeric addition salts with anionic soap-forming carboxylic, sulfonic and sulfuric acids of high molecular weight, e. g., aromatic, sulfonic and carboxylic acids containing a hydrocarbon radical of at least 10 carbon atoms, and aliphatic carboxylic, sulfonic and sulfuric acids. The polymeric addition salts are film-forming producing hard, smooth layers which are resin-like in appearance and insoluble in water and dilute aqueous alkaline solutions such as photographic developer solutions. The aromatic and aliphatic carboxylic, sulfonic and sulfuric acid compounds add onto recurring trivalent nitrogen atoms of the vinylpyridine polymers by an addition bond and form polymeric pentavalent nitrogen addition salts.

The aromatic and aliphatic carboxylic, sulfonic and sulfuric acid compounds which may be used in accordance with the invention correspond to the so-called anion soaps such as the alkane carboxylic acids of 10 to 18 carbon atoms, the alkane sulfonic acids of 10 to 18 carbon atoms, the mono-alkyl sulfates of 10 to 18 carbon atoms, and the alkylated benzene and naphthalene sulfonic acids having at least 10 carbon atoms wherein the alkyl groups contain from 3 to 18 carbon atoms and 1 to 3 groups are present in the aromatic nucleus.

The addition salts of the vinylpyridine polymers with the aromatic and aliphatic carboxylic, sulfonic and sulfuric acids may be prepared by admixing the vinylpyridine polymers with one or a mixture of 2, 3, 4 or more of the free acids just described, in an aqueous solution. It is not necessary, however, to initially add the carboxylic, sulfonic or sulfuric acid compound as the free acid. To the contrary, the alkali metal, ammonium or amine salts may be used and the aqueous solution made acid if necessary by the addition of a highly ionizable or strong organic or inorganic acid, e. g., hydrochloric, sulfuric, or acetic. The concentration of the acid can be relatively weak, but sufficient to assure or initiate the presence of the free acid, e. g., organic sulfonic or sulfuric acids. The polymeric polyvinylpyridine salt precipitates out and can be purified by washing in water and recrystallizing from an organic solvent, e. g., methanol, ethanol, etc.

The novel photographic elements of this invention can be made by dissolving the polymeric polyvinylpyridine polymer addition salt with the anionic soap-forming acid in an organic solvent such as methanol or ethanol or a mixture of such solvents and then coating it onto a photographic sheet support or a layer on the photographic support to form an anti-static layer.

Representative photographic elements are shown in the attached drawing which constitutes a part of this specification. Referring now to the drawing, a photographic film base 1 composed of a hydrophobic cellulose derivative, e. g., cellulose acetate, cellulose nitrate, cellulose propionate, or cellulose-acetate-butyrate, etc.; or a super polymer such as nylon, polyvinyl chloride or a polyester is coated on one surface with a methanol solution of the polymeric addition salt of a polyvinylpyridine polymer with an aforementioned anionic soap-forming acid and the layer 2 dried. The thickness of the layer may vary considerably but in general a thickness of from 0.1 to 10 microns is sufficient. The other surface of the film base can then be provided with a thin anchoring substratum 3 and one or more colloid silver halide emulsion layers 4. An additional layer 5 of the above polymeric addition salt of the vinylpyridine polymer can be coated on the outer emulsion layer if desired where it will serve not only as an anti-static but also as an anti-abrasion layer.

Polyvinylpyridines or vinylpyridine polymers can be made by polymerizing a monomeric vinylpyridine of relatively low molecular weight, e. g., alpha-, beta- or gamma-vinylpyridine, or a homologue thereof containing an alkyl radical of 1 to 4 carbon atoms attached to a carbon atom in the pyridine ring, in a liquid medium by the aid of a vinyl compound polymerization catalyst. An organic solvent solution can be used as the liquid medium, if desired. However, the organic solvent should be inert so that it will not interfere with the polymerization reaction. The polymers can be made by emulsion polymerization or bulk polymerization methods. The polymerization is preferably carried out in an aqueous acid solution or medium in the presence of a peroxy compound catalyst at temperatures from about 20 to 50° C. for a period of 10 or less to 200 or more hours. The proportion of acid, e. g., hydrochloric or sulfuric acid, used may vary over a fairly wide range, e. g., from 0.5 to 2.5 moles of acid per mole of vinylpyridine monomer. The resulting solution may be diluted with water and admixed with a basic solution, e. g., aqueous sodium hydroxide, whereupon a vinylpyridine polymer precipitates which can be washed and dried. In some cases, it is desirable to incorporate a neutralizing agent in the washing solutions to remove any remaining acid catalyst.

The vinylpyridine polymers described above, including the lower alkyl substituted polyvinylpyridines, are of relatively high molecular weight and form clear, hard, resinous films. They are soluble in 1% aqueous acetic acid and similar concentrations of other acids, e. g., hydrochloric, sulfamic, sulfuric and oxalic acids.

The vinylpyridine polymers need not consist wholly of a single polymerized monomer. To the contrary, a mixture of two or more monomeric vinylpyridines as described above can be used. In addition, copolymers which contain up to 20% of another polymerizable vinyl or vinylidene compound ($CH_2=C<$) are useful. The latter compounds may be admixed with the monomeric vinylpyridine, and the polymerization carried out in a similar manner. The copolymers likewise should be soluble in 1% aqueous acetic acid. Suitable compounds for copolymerization include styrene, acrylic acid esters and amides, alpha-alkyl substituted acrylic esters and amides, and acrylonitrile and methacrylonitrile. Among the specific useful compounds of this type are methyl and ethyl acrylates and methacrylates; methacrylamide and N-methyl-acrylamide; acrylonitrile and methacrylonitrile. Mixtures of two or more of the polymerizable vinyl or vinylidene compounds can be used, if desired.

The invention will be further illustrated but is not intended to be limited by the following examples:

*Example I*

A solution of 3.5 grams of sodium isopropyl β-naphthalene sulfonate in 300 milliliters of water was added with stirring to 120 milliliters of a 10% solution in methanol of poly-2-vinylpyridine containing 2 milliliters of glacial acetic acid per 22 milliliters of solution. The pH of the solution was slightly acid and a polymeric addition salt of the anionic surface active wetting agent with the poly-2-vinylpyridine was precipitated. The poly-2-vinylpyridine was soluble in 1% acetic acid, insoluble in water and alkaline photographic developer soltuions and formed clear, hard, resin-like films. The polymeric salt which was isolated was soluble in methanol and ethanol. When the salt was coated from ethanol or methanol solution on a support, a transparent, hard, resin-like film was formed.

*Example II*

Another poly-2-vinylpyridine addition salt was made after the manner which has been described in Example I by substituting an equivalent amount of a mixture of sodium alkyl sulfates of 10 to 18 carbon atoms, predominating in sodium alkyl sulfates of 12 carbon atoms, for the sodium isopropyl β-naphthalene sulfonic acid described in the preceding example. The reactant solution also had a pH on the acid side. The poly-2-vinylpyridine addition salt of the alkyl sulfates had properties similar to the addition salts of Example I.

*Example III*

Another poly-2-vinylpyridine addition salt was made after the manner described in Example I, by substituting a higher fatty acid amide of an amino ethane sulfonic acid, e. g., $C_{17}H_{33}CONHCH_2CH_2SO_3Na$ for the anionic soap-forming acid described in Example I. The reactant solution had a pH on the acid side. The polymeric addition salt of the amido ethane sulfonic acid had properties similar to the addition salts of Example I.

*Example IV*

Solutions of the polymeric salts described in Examples I, II and III were prepared by dissolving one gram of the salt in 99 grams of ethanol. Each of these solutions was then applied to one side of cellulose acetate film base and to one side of cellulose nitrate film base. In all cases, the coated layers were clear, smooth, hard and uniform in characteristics. The contact potentials of the various samples against a light-sensitive iodobromide emulsion are given in the following table:

| Anti-Static Layer | Type Film Base | Contact Potential |
| --- | --- | --- |
| None | cellulose nitrate | −35 |
| Polyvinylpyridine Salt of Example I | do | +50 |
| Polyvinylpyridine Salt of Example II | do | +50 |
| Polyvinylpyridine Salt of Example III | do | +50 |
| None | do | +15 |
| Polyvinylpyridine Salt of Example I | cellulose acetate | +35 |
| Polyvinylpyridine Salt of Example II | do | +25 |
| Polyvinylpyridine Salt of Example III | do | +35 |

The fact that the contact potential was changed from a negative to a positive value in the case of cellulose nitrate film base and was increased from a lower to a higher positive value in the case of cellulose acetate film base is recognized as an advantage in eliminating or reducing the difficulties due to static discharge when emulsion coated films of this type are unrolled.

The contact potentials referred to in the foregoing examples were tested in the following manner:

A sample (8 inches by 35 mm) of the film to be tested was folded in half, with the surface to be tested out. This sample was then run, fold first, through a pair of motor driven rolls which were coated with a photographic gelatin silver halide emulsion. The sample fell into a cup attached to the knob on an electrometer. The needle moved up to a maximum and then slowly oscillated back and forth. The maximum value was recorded as the reading. The sign of the reading charge on the electrometer was determined by bringing an object of known charge close to the cup of the electrometer immediately after the maximum value for the unknown sample had been recorded. Thus, if the known charge is negative and if the needle is moving up when the charged object is brought near the cup and stops, the charge on the electrometer is positive.

*Example V*

Solutions of the polymeric salts described in Examples I, II and III were prepared by dissolving one gram of the salt in 99 grams of ethanol. Each of these solutions was then applied to one side of cellulose acetate film base and to one side of cellulose nitrate film base. To the reverse side of the cellulose acetate films a gelatin subbing solution of the following composition was applied:

| | Per cent |
| --- | --- |
| Gelatin | 1 |
| Glacial acetic acid | 4 |
| Methanol | 40 |
| Acetone | 55 |

To the reverse side of the cellulose nitrate films, a gelatin subbing solution of the following composition was applied:

| | Per cent |
| --- | --- |
| Gelatin | 1.0 |
| Salicylic acid | 0.5 |
| Water | 1.0 |
| Methanol | 97.5 |

All samples were coated with light-sensitive pan-chromatic gelatino iodobromide emulsion and dried. Samples were flashed and developed in a solution of the following composition:

| | | |
| --- | --- | --- |
| Water | ccs | 975.0 |
| N-methyl-p-aminophenol sulfate | grams | 2.5 |
| Sodium sulfite (anhyd.) | do | 75.0 |
| Hydroquinone | do | 3.0 |
| Borax | do | 5.0 |

The developed films were washed and "fixed" in the following solution:

| | | |
| --- | --- | --- |
| Sodium thiosulfate | grams | 240.0 |
| Sodium sulfite (anhyd.) | do | 15.0 |
| Borax | do | 18.0 |
| Glacial acetic acid | cc | 12.0 |
| Potassium alum | grams | 20.0 |
| Water to make 1 liter. | | | and the films were then washed and dried.

The sensitometric properties of these films were similar to control films which did not contain a poly-2-vinylpyridine salt layer on the side opposite the emulsion layer thus establishing the fact that the layer of the poly-2-vinylpyridine addition salt had no adverse effects.

In place of the anionic surface active wetting agents described in the foregoing examples there may be substituted a large number of other anion soap-forming acids or their alkali metal, ammonium or water-soluble amine salts, or mixtures of such compounds, with similar results. The compounds which contain a sulfonic acid or sulfuric acid group, i. e., a sulfur acid group, are preferred to the carboxylic acid compounds.

Suitable compounds include the normal decyl, monyl, dodecyl, tetradecyl, hexadecyl, heptadecyl and octadecyl sulfonic acid and hydrogen sulfates and their corresponding sodium, potassium, ammonium, ethanolamine, diethanolamine, triethanolamine, trimethylamine, and cyclohexylamine salts. Still other useful compounds include 2-methyl dodecyl sulfate, oleyl hydrogen sulfate; hexylphenyl, decylphenyl, dodecylphenyl and dipentylphenyl sulfonic acids; diisopropyl, and triisopropyl naphthalene sulfonic acid, lauric acid, stearic acid, palmitic acid and their water-soluble salts.

The preferred polymeric salts are those obtained from poly-2-vinylpyridine and normal alkyl hydrogen sulfates of 10 to 18 carbon atoms.

The proportion of anionic soap-forming acid or water-soluble salt thereof to the vinylpyridine polymer may vary over a fairly wide range. One molecular proportion of the former compound can be used for each nitrogen atom in the vinylpyridine polymer, if desired. In fact, an excess can be used. In general, however, from 0.1 to 0.5 part per part by weight of the vinylpyridine polymer are used.

The polymeric addition salts of the vinylpyridine polymers with the anionic soap-forming acids may be admixed with various hydrophilic colloids and coated in similar manner. In general, the polymeric addition salt should predominate in the layer. Thus, the polymeric addition salt may be mixed with gelatin, albumin, polyvinyl alcohol, etc., and coated onto the rear surface of a photographic film or onto a gelatino silver halide or other water-permeable colloid silver halide emulsion layer. The polymeric addition salts can be added to a silver halide emulsion before coating, if desired. The use of the polymeric addition salts in a colloid silver halide emulsion and as an anti-static layer on the rear surface of a photographic film element is particularly advantageous.

The present invention has the advantage that it provides a simple and effective means for reducing the static in photographic film elements. The salts can be applied by the same coating methods used for applying sublayers, silver halide emulsion layers, etc., to supports. Thus, they may be used with the conventional equipment which is present in the plants of the photographic manufacturer. The coatings formed are useful as both anti-static and anti-abrasion layers.

This application is a continuation-in-part of my co-pending application Ser. No. 104,820, filed July 14, 1949 now abandoned.

As many widely different embodiments of this invention can be made without departing from the spirit and scope thereof, it is to be understood that the invention is not to be limited except as defined by the claims.

What is claimed is:

1. A photographic element comprising a support having at least one silver halide emulsion layer, said element having in at least one outer stratum thereof, a polymeric salt of a polymer taken from the group consisting of polymers of alpha-, beta- and gamma-vinylpyridine and their homologues which have an alkyl radical of 1 to 4 carbons attached to a carbon atom in the pyridine ring with an anionic soap-forming acid of high molecular weight taken from the group consisting of alkane carboxylic, alkane sulfonic and alkane sulfuric acids of 10 to 18 carbon atoms and alkylbenzene and alkylnaphthalene sulfonic acids of at least 10 carbon atoms wherein the alkyl groups contain 3 to 18 carbon atoms, the recurring nitrogen atoms of said polymer being joined to said acid by an addition bond.

2. A photographic element comprising a sheet support having at least on silver halide emulsion layer, said element having in at least one outer stratum thereof, a polymeric salt of a polyvinylpyridine with an alkane carboxylic acid of 10 to 18 carbon atoms, the recurring nitrogen atoms of said polyvinylpyridine being joined to said acid by an addition bond.

3. A photographic element comprising a sheet support having at least one silver halide emulsion layer, said element having in at least one outer stratum thereof, a polymeric salt of a polyvinylpyridine with an alkane sulfonic acid of 10 to 18 carbon atoms, the recurring nitrogen atoms of said polyvinylpyridine being joined to said acid by an addition bond.

4. A photographic element comprising a sheet support having at least one silver halide emulsion layer, said element having in at least one outer stratum thereof, a polymeric salt of a polyvinylpyridine with an alkane sulfuric acid of 10 to 18 carbon atoms, the recurring nitrogen atoms of said polyvinylpyridine being joined to said acid by an addition bond.

5. A photographic element comprising a sheet support having at least one silver halide emulsion layer, said element having in at least one outer stratum thereof, a polymeric salt of a poly-2-vinylpyridine with an anionic sulfur-containing, soap-forming acid of 10 to 18 carbon atoms wherein the sulfur acid is contained in a —SO₃— group, the recurring nitrogen atoms of said poly-2-vinylpyridine being joined to said acid by an addition bond.

6. A photographic element comprising a sheet support having at least one silver halide emulsion layer, said element having in at least one outer stratum thereof, a polymeric salt of a polyvinylpyridine with an alkyl hydrogen sulfate of 10 to 18 carbon atoms, the recurring nitrogen atoms of said polyvinylpyridine being joined to said sulfate by an addition bond.

7. A photographic element comprising a hydrophobic film base having at least one water-permeable colloid silver halide emulsion layer supported by one surface and an anti-static layer on the other surface, the latter layer comprising a polymeric salt of a polymer taken from the group consisting of polymers of alpha-, beta- and gamma-vinylpyridine and their homologues which have an alkyl radical of 1 to 4 carbons attached to a carbon atom in the pyridine ring with an anionic soap-forming acid of high molecular weight taken from the group consisting of alkane carboxylic, alkane sulfonic and alkane sulfuric acids of 10 to 18 carbon atoms and alkylbenzene and alkylnaphthalene sulfonic acids of at least 10 carbon atoms wherein the alkyl groups contain 3 to 18 carbon atoms, the recurring nitrogen atoms of said polymer being joined to said acid by an addition bond.

8. A photographic element comprising a hydrophobic film base having at least one water-permeable colloid silver halide emulsion layer supported by one surface and an anti-static layer on the other surface, the latter layer comprising a polymeric salt of a poly-2-vinylpyridine with an anionic sulfur-containing, soap-forming acid of 10 to 18 carbon atoms wherein the sulfur acid is contained in a —SO₃— group, the recurring nitrogen atoms of said poly-2-vinylpyridine being joined to said acid by an addition bond.

9. A photographic element comprising a hydrophobic film base having at least one water-permeable colloid silver halide emulsion layer supported by one surface and an anti-static layer on the other surface, the latter layer comprising a polymeric salt of a polyvinylpyridine with an alkyl hydrogen sulfate of 10 to 18 carbon atoms, the recurring nitrogen atoms of said polyvinylpyridine being joined to said sulfate by an addition bond.

10. A photographic element comprising a hydrophobic film base having at least one water-permeable colloid silver halide emulsion layer supported by one surface a protective layer on said emulsion layer and an anti-static layer on the other surface, each of said layers comprising a polymeric salt of a polymer taken from the group consisting of polymers of alpha-, beta- and gamma-vinylpyridine and their homologues which have an alkyl radical of 1 to 4 carbons attached to a carbon atom in the pyridine ring with an anionic soap-forming acid of high molecular weight taken from the group consisting of alkane carboxylic, alkane sulfonic and alkane sulfuric acids of 10 to 18 carbon atoms and alkylbenzene and alkylnaphthalene sulfonic acids of at least 10 carbon atoms wherein the alkyl groups contain 3 to 18 carbon atoms, the recurring nitrogen atoms of said polymer being joined to said acid by an addition bond.

References Cited in the file of this patent

UNITED STATES PATENTS 2,612,446   Umberger _____ Sept. 30, 1952